United States Patent [19]

Kuroda

[11] Patent Number: 5,303,158
[45] Date of Patent: Apr. 12, 1994

[54] MISFIRE-DETECTING SYSTEM FOR AN INTERNAL COMBUSTION ENGINE

[75] Inventor: Shigetaka Kuroda, Wako, Japan

[73] Assignee: Honda Giken Kogyo Kabushiki Kaisha, Tokyo, Japan

[21] Appl. No.: 672,796

[22] Filed: Mar. 21, 1991

[30] Foreign Application Priority Data

May 14, 1990 [JP] Japan .................. 2-123574

[51] Int. Cl.[5] .................. G06F 15/50; G01M 15/00
[52] U.S. Cl. .................. 364/431.08; 364/424.03; 364/551.01; 123/419; 123/554; 73/117.3
[58] Field of Search .................. 364/431.08, 424.03, 364/551.01; 123/425, 419, 436, 554; 73/117.3

[56] References Cited

U.S. PATENT DOCUMENTS

| 4,345,558 | 8/1982 | Yamaguchi et al. | 123/425 |
| 4,424,709 | 1/1984 | Meier, Jr. et al. | 73/117.3 |
| 4,919,099 | 4/1990 | Extance et al. | 123/425 |
| 4,991,553 | 2/1991 | Kurihara et al. | 123/425 |
| 5,044,195 | 9/1991 | James et al. | 73/117.3 |
| 5,117,792 | 6/1992 | Kanno | 123/198 F |
| 5,119,783 | 6/1992 | Komurasaki | 123/425 |
| 5,127,262 | 7/1992 | Demizu et al. | 73/117.3 |

FOREIGN PATENT DOCUMENTS

61-258955 11/1986 Japan .

Primary Examiner—Thomas G. Black
Assistant Examiner—Tan Q. Nguyen
Attorney, Agent, or Firm—Armstrong, Westerman, Hattori, McLeland & Naughton

[57] ABSTRACT

A system for detecting abnormality in combustion of an internal combustion engine based on fluctuations in the rotational speed of the engine. A signal corresponding to the rotational speed of the engine is subjected to frequency analysis. Abnormality in combustion of the engine is detected based on amplitude of components of the signal at respective predetermined frequencies, the components being obtained by the frequency analysis.

14 Claims, 8 Drawing Sheets

TDC IMMEDIATELY BEFORE IGNITION OF CYLINDER #1

FIG.7

# MISFIRE-DETECTING SYSTEM FOR AN INTERNAL COMBUSTION ENGINE

BACKGROUND OF THE INVENTION

1. Field of the Invention

This invention relates to a system for detecting abnormality in combustion of an internal combustion engine, and more particularly, to a misfire-detecting system which detects misfire occurring in a multi-cylinder type internal combustion engine based on fluctuations in the rotational speed of the engine.

2. Description of the Related Art

Conventionally, a system is already known from Japanese Provisional Patent Publication (Kokai) No. 61-258955, which detects abnormality in combustion, particularly so-called misfire, i.e. failure to ignite an air-fuel mixture, of a particular cylinder of a multi-cylinder type internal combustion engine, and warns the driver of the abnormality or inhibits fuel from being injected into the particular cylinder.

The conventional system is based upon the recognition that minor fluctuations are caused in the rotational speed of the engine by combustion in each cylinder. Therefore, an amount of change in the rotational speed of the engine per cycle of the fluctuations is obtained from the difference between the maximum rotational speed and the minimum rotational speed of the engine per each cycle of the fluctuations, and when the ratio of the amount of change in the present cycle of the fluctuations to the amount of change in the immediately preceding cycle of the fluctuations is smaller than a predetermined value, it is determined that a misfire has occurred in a cylinder.

However, the ratio can be small due to factors other than misfire, e.g. fluctuations in the air-fuel ratio of an air-fuel mixture supplied to the engine, or delayed flow of fuel adhering to the inner surfaces of the intake pipe at acceleration or deceleration of the engine, etc, which can cause the system to erroneously judge that a misfire has occurred.

Further, the ratio is obtained based on amounts of change in the rotational speed of the engine respectively calculated for two different cylinders which are adjacent to each other in the order of ignition. On the other hand, the amount of change varies between cylinders even under the same operating conditions of the engine. Therefore, the ratio can be small even when no misfire has occurred. This can also cause the system to erroneously judge that a misfire has occurred, even in the absence of the aforementioned factors other than misfire.

SUMMARY OF THE INVENTION

It is the object of the invention to provide a misfire-detecting system for an internal combustion engine which enables an accurate detection of abnormalities in combustion.

To attain the above object, the present invention provides a system for detecting an abnormality in combustion of an internal combustion engine based on fluctuations in the rotational speed of the engine.

The system according to the invention is characterized by comprising:

signal-outputting means for outputting a signal corresponding to the rotational speed of the engine;

frequency-analyzing means for subjecting the signal from the signal-outputting means to frequency analysis; and abnormality-detecting means for detecting abnormality in combustion of the engine based on amplitude of components of the signal at respective predetermined frequencies, the components being obtained by the frequency analysis.

Preferably, the abnormality-detecting means comprises:

comparing means for comparing the amplitude of each of the components of the signal at the respective predetermined frequencies, with the amplitude of a component of the signal at a second predetermined frequency, the component of the signal at the second predetermined frequency being obtained by the frequency analysis; and abnormality-determining means for determining abnormality in combustion of the engine based on results of the comparison carried out by the comparing means.

For instance, the comparing means calculates an absolute value of a difference between the amplitude of each of the components of the signal at the respective predetermined frequencies, and the amplitude of the component of the signal at the second predetermined frequency, and the abnormality-determining means determines that there is abnormality in combustion of the engine when the absolute value of the difference is smaller than a predetermined value.

When the engine comprises a plurality of cylinders, the system may further comprise:

abnormality-forcing means for forcing combustion in a selected one of the cylinders to be abnormal; and abnormal cylinder-determining means for determining whether or not the selected one of the cylinders is a cylinder in which abnormality in combustion occurs based on amplitude of the components of the signal at the respective predetermined frequencies, the components being obtained by the frequency-analyzing means as a result of operation of the abnormality-forcing means.

Preferably, the abnormal cylinder-determining means comprises:

means for calculating a first absolute value of a difference between the amplitude of each of the components of the signal at the respective predetermined frequencies and amplitude of a component of the signal at a second predetermined frequency, the components of the signal at the respective predetermined frequencies and the second predetermined frequency being obtained when the forcing of the combustion of the selected one of the cylinders to be abnormal was not carried out;

means for calculating a second absolute value of the difference between the amplitude of each of the components of the signal at the respective predetermined frequencies and the amplitude of the component of the signal at the second predetermined frequency, the components of the signal at the respective predetermined frequencies and the second predetermined frequency being obtained when the forcing of the combustion of the selected one of the cylinders to be abnormal was carried out;

means for calculating an absolute value of a difference between the first absolute value and the second absolute value; and first determining means for determining that there is a possibility of spontaneous occurrence of abnormality in combustion in the selected one of the cylinders when the last-mentioned absolute value is smaller than a predetermined value.

Each of the respective predetermined frequencies is determined by a number indicative of a period of occurrence of abnormality in combustion in a cylinder.

More specifically, the abnormality-forcing means forces the combustion in the selected one of the cylinders to be abnormal at a period of occurrence of abnormality in combustion at which the first absolute value is smaller than a second predetermined value.

Preferably, the abnormal cylinder-determining means further comprises second determining means for counting a number of times the first determining means determines that there is a possibility of spontaneous occurrence of abnormality in combustion in the selected one of the cylinders, and finally determining that abnormality in combustion spontaneously occurs in the selected one of the cylinders, when the number of times is larger than a predetermined value.

More preferably, the abnormal cylinder-determining means includes frequency-calculating means for calculating a frequency at which abnormality in combustion occurs in the selected one of the cylinders.

For instance, the frequency-calculating means calculates the frequency at which abnormality in combustion occurs in the selected one of the cylinders, by obtaining a reciprocal of a product of a number indicative of the period of occurrence of abnormality in combustion at which the first absolute value is smaller than the second predetermined value and a total number of the cylinders.

The above and other objects, features, and advantages of the invention will become more apparent from the ensuing detailed description taken in conjunction with the accompanying drawings.

DETAILED DESCRIPTION OF THE PREFERRED EMBODIMENTS

The invention will now be described in detail with reference to the drawings showing an embodiment thereof.

Figure 1:
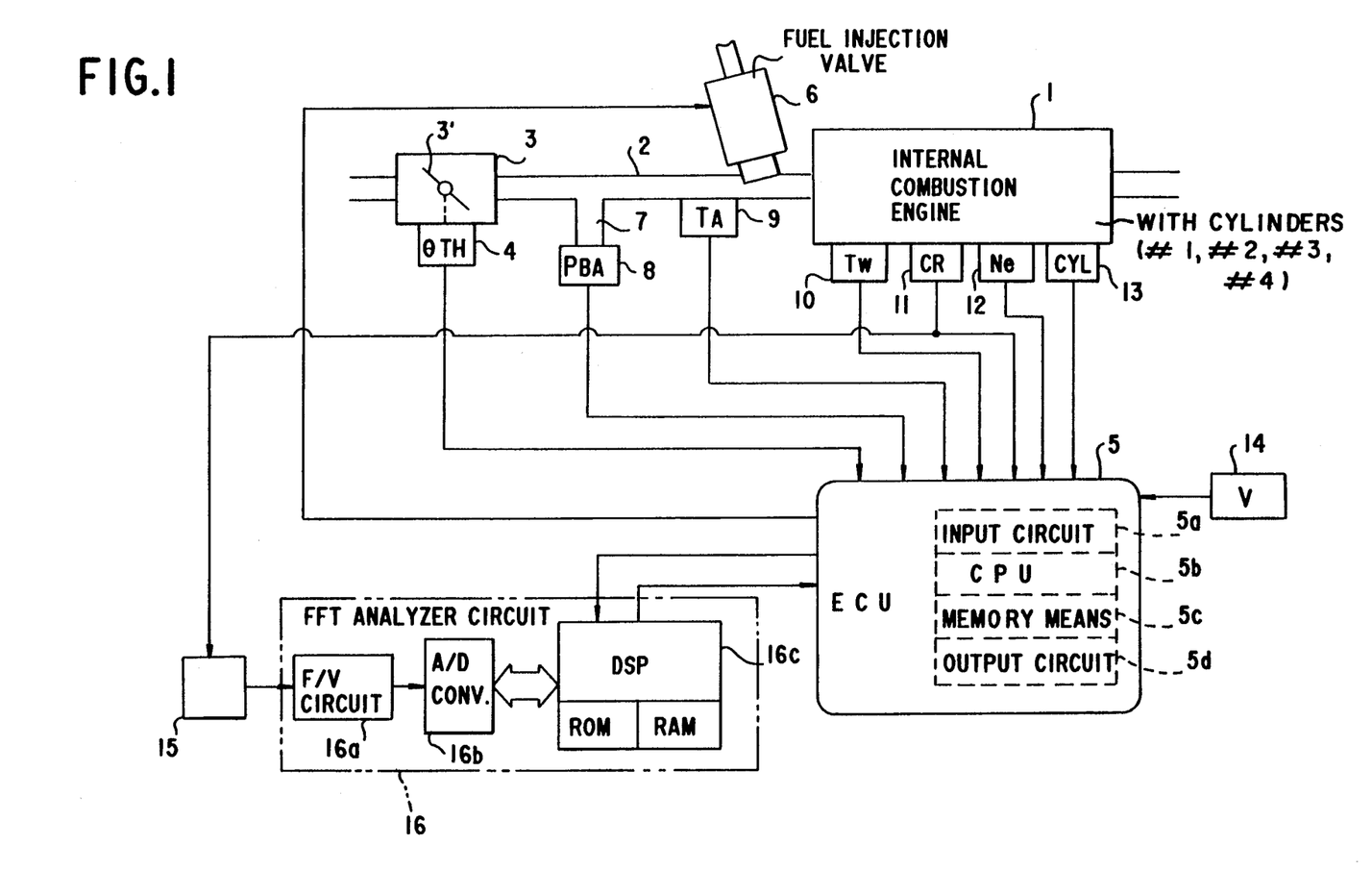
FIG. 1 is a block diagram illustrating the whole arrangement of a fuel supply control system of an internal combustion engine including a misfire-detecting system according to the invention.

Referring first to FIG. 1, there is shown the whole arrangement of a fuel supply control system for an internal combustion engine including a misfire-detecting system according to the invention. In the figure, reference numeral 1 designates an internal combustion engine which comprises, e.g., four cylinders (#1 to #4). Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure ($P_{BA}$) sensor 8 is provided in communication with the interior of the intake pipe 2 at a location immediately downstream of the throttle valve 3' for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ECU 5. A crank angle (CR) sensor 11, an engine rotational speed (Ne) sensor 12 and a cylinder-discriminating (CYL) sensor 13 are arranged in facing relation to a camshaft or a crankshaft of the engine 1, neither of which is shown. The crank angle sensor 11 generates a signal pulse (hereinafter referred to as "a crank signal pulse") whenever the crankshaft rotates through a predetermined angle (e.g. 30°). The engine rotational speed sensor 12 generates a pulse as a TDC signal pulse at each of predetermined crank angles which are prior to the top dead center (TDC) positions of the respective cylinders by a predetermined angle whenever the crankshaft rotates through 180 degrees, while the cylinder-discriminating sensor 13 generates a pulse at a predetermined crank angle of a particular cylinder of the engine, both of the pulses being supplied to the ECU 5.

Further, a vehicle speed (V) sensor 14 for detecting the speed of an automotive vehicle on which the engine is installed is connected to the ECU and supplies an electric signal indicative of the detected vehicle speed to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6.

The CPU 5b operates in response to various engine parameter signals from the above sensors and other sensors, not shown, to determine operating conditions in which the engine 1 is operating, and calculates, based upon the determined operating conditions, the valve opening period or fuel injection period $T_{OUT}$ over which the fuel injection valves 6 are to be opened. The CPU 5b supplies through the output circuit 5d the fuel injection valves 6 with driving signals corresponding to the calculated fuel injection period $T_{OUT}$ over which the fuel injection valves 6 are opened.

The misfire-detecting system is connected to the thus constructed fuel supply control system. Specifically, output from the crank angle sensor 11 is supplied via a waveform shaper circuit 15 to a FFT (Fast Fourier Transform) analyzer circuit 16 which is connected to the ECU 5. The FFT analyzer circuit 16 comprises a frequency-to-voltage converter circuit (hereinafter referred to as "the F/V circuit") 16a, analog-to-digital converter circuit (hereinafter referred to as "the A/D CONV") 16b, and a digital signal-processing circuit (hereinafter referred to as "the DSP") 16c including a ROM and a RAM. The F/V circuit 16a is connected to the waveform shaper circuit 15, while the DSP 16c is connected to the input circuit 5a of the ECU 5.

In the FFT analyzer circuit 16, the F/V circuit 16a generates voltage corresponding to the engine rotational speed Ne based on the frequency of a signal pulse which is generated by the crank angle sensor 11 and the waveform of which is shaped by the waveform shaper circuit 15, and the A/D CONV 16b digitizes and simultaneously quantizes the voltage value. Based on the digitized and quantized signal, the DSP 16c carries out frequency analysis, and simultaneously amplitude spectrum analysis, of fluctuations in the engine rotational speed to thereby detect misfire occurring in any of the cylinders.

Further, the outline of the misfire detection carried out by the FFT analyzer circuit 16 will be described below with reference to FIGS. 2a, 2a(1), 2b, 2b(1) and 3a, 3a(1), 3b, 3b(1), 3c and 3c(1). (FIGS. 2a and 2a(1), 2b and 2b(1), 3a, 3a(1), 3b and 3b(1), 3c and 3c(1) are herein after referred to as FIGS. 2a, 2b, 3a, 3b, 3c, respectively.)

Figure 2A:
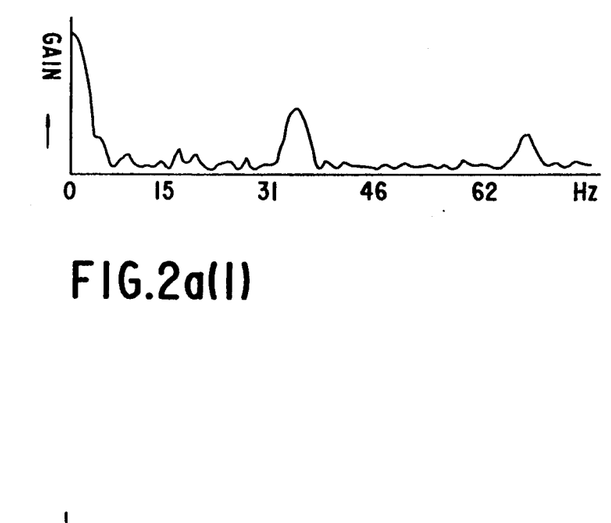
FIGS. 2a, 2a(1) are graphs respectively showing fluctuations and results of frequency analysis thereof when the engine is normal.

The left-hand graph of FIG. 2a shows a waveform of a signal indicative of fluctuations (hereinafter referred to as "$\omega$ fluctuations") in the engine rotational speed Ne caused by ignition and explosion in each cylinder when the four-cylinder type engine is normally functioning without misfire, while the right-hand graph of FIG. 2a shows results of frequency analysis carried out on the waveform of $\omega$ fluctuations. In this graph, $f_{TDC}$ represents the frequency of TDC signal pulses, and $f_{TDC/4}$ represents the frequency of the ignition cycle of any one of the four cylinders, i.e. $f_{TDC}/4$. From the graph, it can be seen that the amplitude or gain, of the $f_{TDC}$ frequency component is larger than that of $f_{TDC/4}$ frequency component.

Figure 2B:
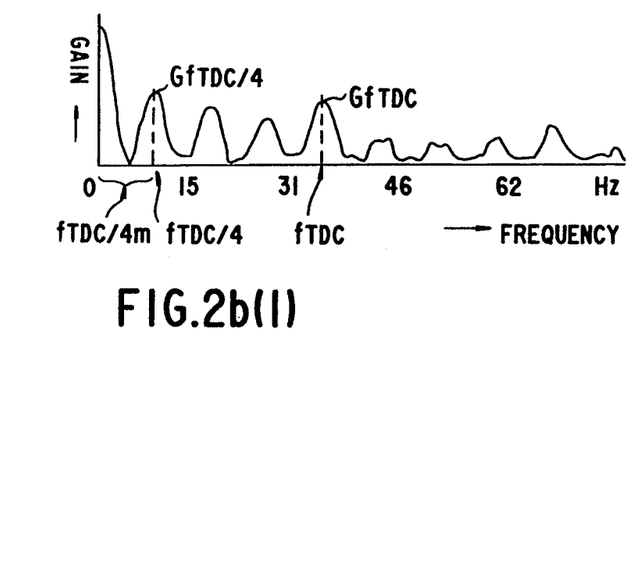
FIGS. 2b, 2b(1) are graphs similar to those of FIG. 2a when misfires occur in a cylinder of the engine.

On the other hand, the graphs of FIG. 2b show a waveform of a signal indicative of $\omega$ fluctuations when misfire continually occurs in a cylinder #1 at igniting timing, and results of frequency analysis carried out on the waveform, respectively. As can be seen from the right-hand graph of FIG. 2b, a gain $Gf_{TDC/4}$ at the frequency $f_{TDC/4}$ is larger than that in the right-hand graph of FIG. 2a. This invention utilizes this phenomenon in detecting misfire in a cylinder.

Incidentally, misfire does not necessarily occur continually in a particular cylinder as in the case of FIG. 2b. When misfire occurs discontinuously, a gain at a frequency $f_{TDC/4m}$ corresponding to the cycle of occurrence of misfire, which is in a range of 0 to $f_{TDC/4}$, increases. Therefore, in the present invention, the gain at the frequency $f_{TDC/4m}$ is monitored to thereby detect misfire. In addition, the frequency $f_{TDC/4m}$ means $f_{TDC}/4m$, m being a natural number e.g. in the range of 1 to 30.

In addition to the misfire-detecting method described above, a predetermined cylinder of an engine in which misfire is detected is forcefully subjected to misfire, and results of frequency analysis of fluctuations obtained by the forced misfire is compared with results of frequency analysis of fluctuations obtained when misfire was detected, whereby a cylinder in which misfire occurs is specified or determined, and at the same time, the period of occurrence of misfire, i.e. the frequency of misfire is calculated. The additional method of detecting misfire will be further described with reference to FIGS. 3a to 3c.

Figure 3A:
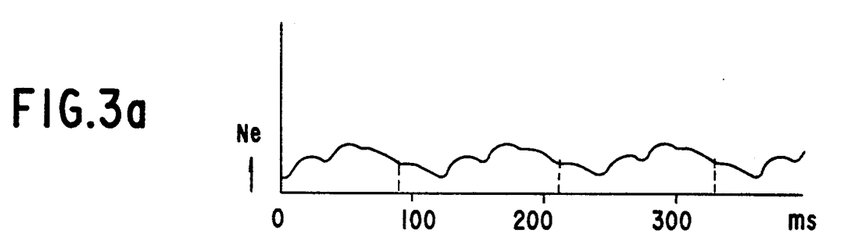
FIGS. 3a, 3a(1), 3b, 3b(1), 3c, 3c(1) are graphs similar to those of FIGS. 2a, 2a(1) and 2b, 2b(1), when different cylinders are respectively subjected to forced misfire in an engine, a cylinder of which suffers from misfire.

FIG. 3a shows $\omega$ fluctuations when a cylinder #2 is forcefully subjected to misfire when misfire continually occurs in the cylinder #1, and results of frequency analysis thereof. Similarly, FIG. 3b shows $\omega$ fluctuations when a cylinder #4 is forcefully subjected to misfire when misfire continually occurs in the cylinder #1, and results of frequency analysis thereof, and FIG. 3c shows $\omega$ fluctuation when the cylinder #1 is forcefully subjected to misfire when misfire continually occurs in the cylinder #1, and results of frequency analysis thereof.

Figure 3B:
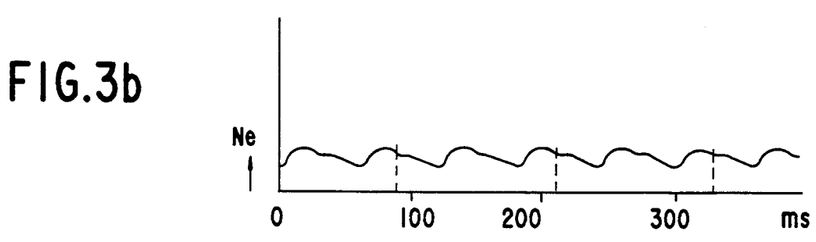
Figure 3C:
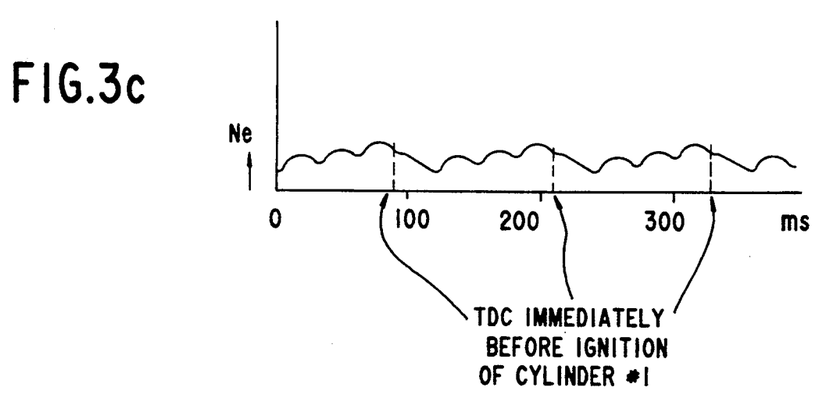

By comparing the results of frequency analysis of FIGS. 3a to 3c with the results of frequency analysis of FIG. 2b, the cylinder in which misfire occurs, i.e. the cylinder #1 in the present case, is specified, and the frequency of misfire is calculated.

In this connection, in the above methods described with reference to FIGS. 2a, 2b, and 3a to 3c, comparison between the results of frequency analysis is carried out based on the difference between the gain $Gf_{TDC}$ at $f_{TDC}$ and the gain $Gf_{TDC/4m}$ at $f_{TDC/4m}$, which enables improvement in the accuracy in detection of misfire, and the accuracy in specifying a cylinder in which misfire occurs as well as the accuracy in calculation of frequency of misfire.

The manners of detection of misfire executed by the ECU 5 and the DSP 16c will be further described with reference to FIGS. 4 to 7 showing control programs. These programs are carried out upon generation of each clock pulse by a timer at a predetermined period.

Figure 4:
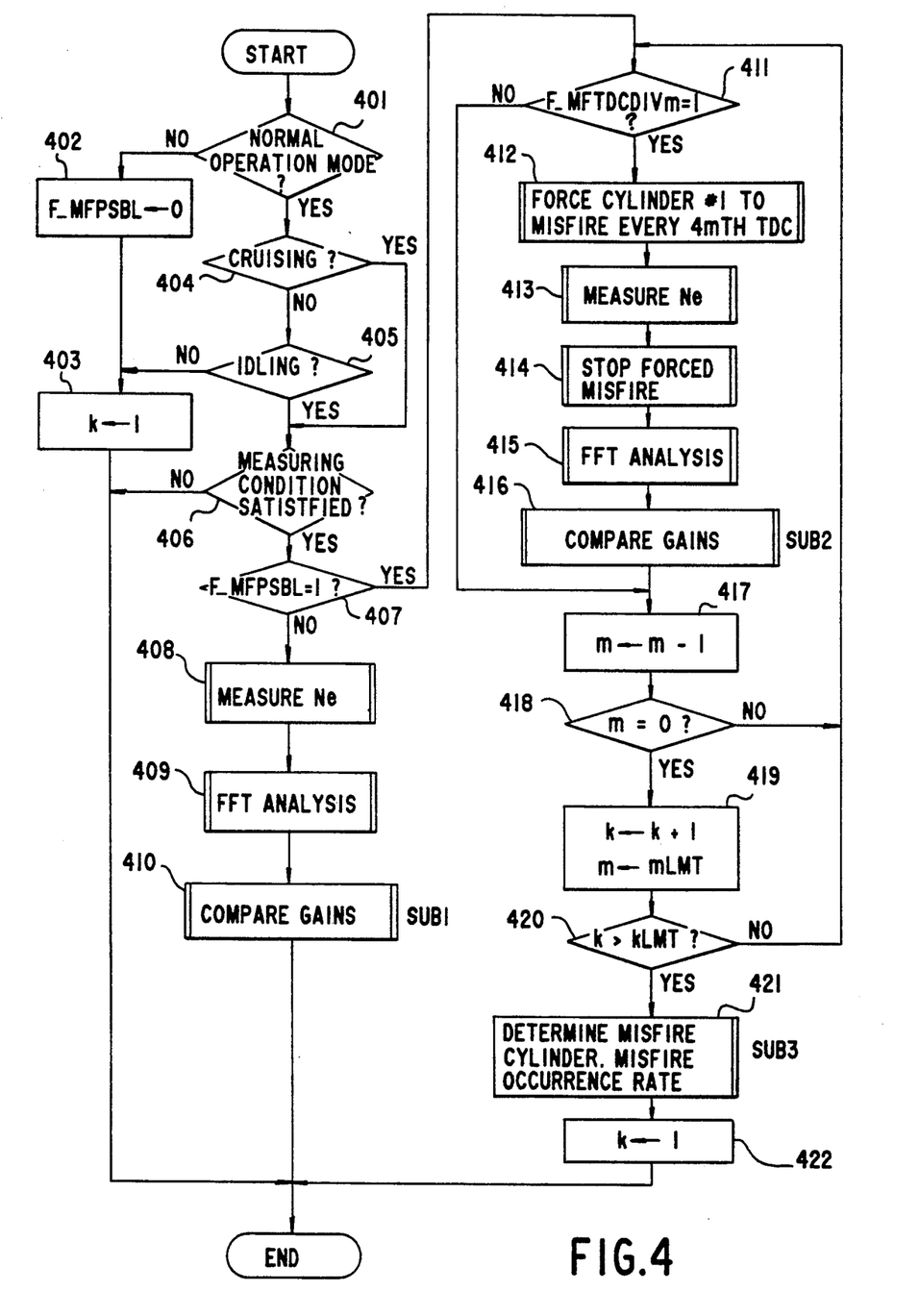
FIG. 4 is a flowchart of a program showing the manner of detection of misfire executed by an ECU 5 and a DSP 16c appearing in FIG. 1.

First, at a step 401, it is determined whether or not a predetermined time period (e.g. 1 second) has elapsed after the engine 1 changed from starting operation mode to normal operation mode. If the answer to this question is negative (No), a flag $F_{MFPSBL}$ which indicates a possibility of misfire when set to a value of 1 is set to 0 at a step 402, and a number k, which can be set to different values corresponding respectively to the cylinders, is set to 1, followed by terminating the present program.

On the other hand, if the answer to the question of the step 401 is affirmative (Yes), i.e. if the predetermined time period has elapsed after the engine entered the normal operation mode, it is determined at a step 404 whether or not the vehicle is cruising, and at a step 405 whether or not the engine 1 is idling. The determination at the step 404 is carried out by determining whether or not the vehicle speed V, the throttle valve opening $\theta_{TH}$, and the intake pipe absolute pressure $P_{BA}$ are within respective predetermined ranges.

If both of the answers to the questions of the steps 404 and 405 are negative (No), the program proceeds to a step 403, while if either of the answers is affirmative (Yes), i.e. if the vehicle is cruising or the engine 1 is idling, the program proceeds to a step 406. At the step 406, it is determined whether or not a condition for starting measuring $\omega$ fluctuations is satisfied. The condition is a condition that the engine 1 is stable in the normal operation mode, and at the same time a stable operating condition of the engine such as cruising of the vehicle and idling of the engine has continued over a predetermined time period (e.g. 2 seconds) or longer.

If the answer to the question of the step 406 is negative (No), the present program is immediately terminated, whereas if the answer is affirmative (Yes), i.e. the condition for starting measuring $\omega$ fluctuations is satisfied, the program proceeds to a step 407. At the step 407, it is determined whether or not the flag $F_{-MFPSBL}$ is equal to 1. If the answer to this question is negative (No), i.e. if misfire has not been detected, the program proceeds to steps 408 to 410 where misfire detection is carried out, whereas if the answer is affirmative (Yes), the program proceeds to steps 411 to 422 where forced misfire is carried out to thereby specify a cylinder in which misfire occurs and calculate the frequency of misfire.

First, at a step 408, the engine rotational speed Ne is determined by the waveform shaper circuit 15 and the F/V circuit 16a based on output from the crank angle (CR) sensor 11. The engine rotational speed Ne is subjected to frequency analysis at the A/D CONV 16b and DSP 16c at a step 409. Then based on the results of frequency analysis, a gain at each predetermined frequency is compared with a gain at $f_{TDC}$ by the DSP 16c at a step 410.

Details of the step 410 will be described below with reference to a subroutine SUB 1 of FIG. 5.

First, at a step 501, an integer m corresponding to the period of occurrence of misfire is set to a predetermined value mLMT (e.g. 30). If m is equal to 1, it means that misfire continually occurs in a particular cylinder at every time point the cylinder should be ignited, and if m is equal to 2, it means that misfire occurs in a particular cylinder at every second time point the cylinder should be ignited. In general, the value of m indicates that misfire occurs in a particular cylinder at every mth time point the cylinder should be ignited.

At the following step 502, when the integer m assumes the present value, a flag $F_{-MFTDCDIVm}$ corresponding to the present value m, which indicates, when assuming a value of 1, that there is a possibility that misfire has occurred which has the period of occurrence indicated by the present value m, is set to 0, followed by the program proceeding to a step 503. At the step 503, an absolute value of the difference between the gain $Gf_{TDC}$ at the frequency $f_{TDC}$ and a gain $Gf_{TDC/4m}$ at a frequency $f_{TDC/4m}$ (m is the present value) is obtained as $\Delta G_{NTLm}$, and at the following step 504, it is determined whether or not the absolute value $\Delta G_{NTLm}$ is smaller than a predetermined reference value $\Delta G_{LMT}$ (e.g. 5 dB).

As explained hereinbefore with reference to FIG. 2a, if no misfire occurs in any of the cylinders, the absolute value $\Delta G_{NTLm}$ should assume a larger value than the value $\Delta G_{LMT}$, so that the answer to the question of the step 504 is negative (No), followed by the program proceeding to a step 507, where the integer m is decreased by a decremental value of 1, and then at a step 508, it is determined whether or not the resulting integer m is equal to 0. If the answer to the question of the step 508 is negative (No), i.e. if the integer m is not yet equal to 0, the program returns to the step 502, and thereafter misfire detection is carried out with respect to a new period of occurrence of misfire indicated by the integer m decreased at the step 507. On the other hand, if the answer to the question of the step 508 is affirmative (Yes), the integer m is set to the predetermined value mLMT at a step 509, followed by terminating the present subroutine, and also terminating the main routine of FIG. 4.

On the other hand, if the answer to the question of the step 504 is affirmative (Yes), it is judged that misfire occurs in any of the cylinders at every mth ignition timing thereof, whereby the flag $F_{-MFTDCDIVm}$ corresponding to the present value m is set to 1 at a step 505, and a flag $F_{-MFPSBL}$ which indicates, when assuming a value of 1, that there is a possibility that misfire has occurred irrespective of the present value of the integer m, is set to 1 at a step 506, followed by the program proceeding to the step 507.

As described above, in the subroutine SUB 1, misfire detection is carried out for each value of the integer m which corresponds to the period of occurrence of misfire in any of the cylinders or the reciprocal of the rate of occurrence of misfire.

Figure 5:
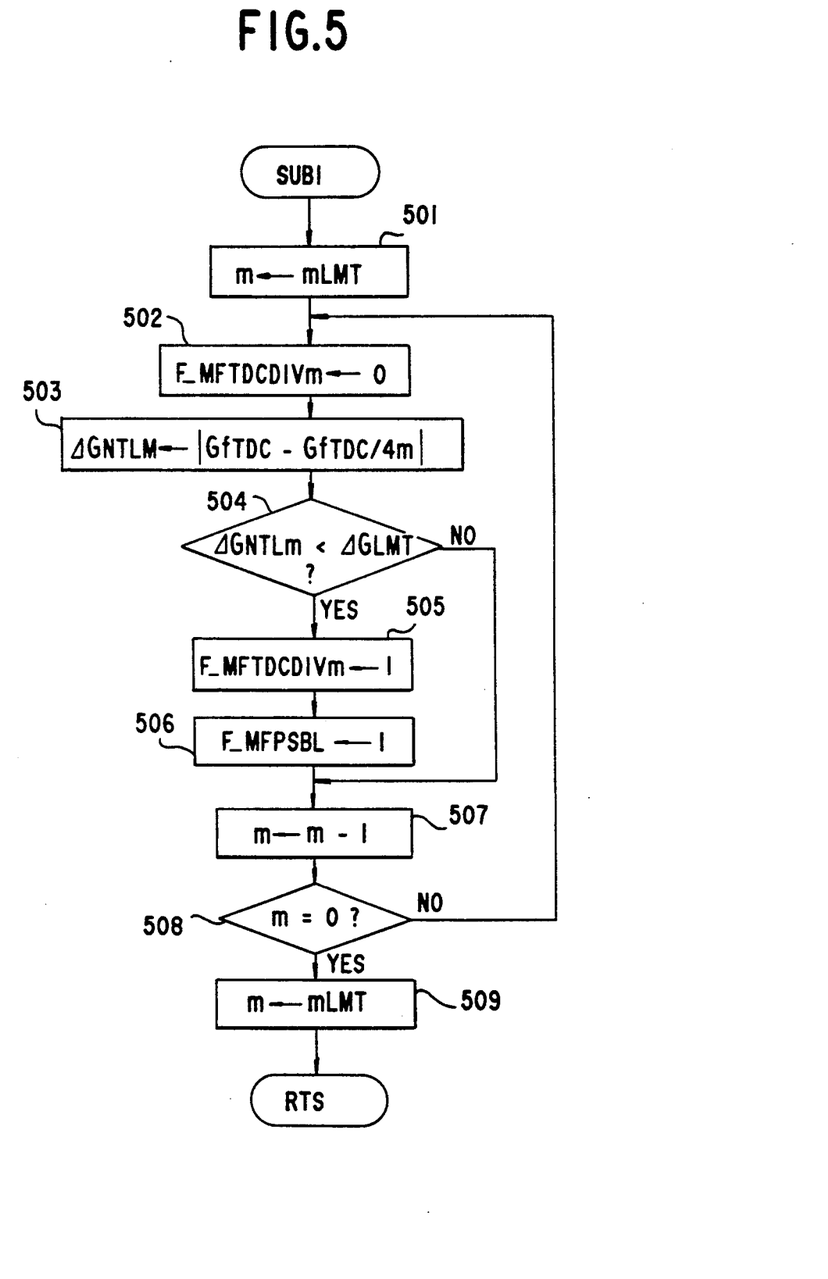
FIG. 5 is a flowchart of a subroutine SUB 1 executed at a step 410 appearing in FIG. 4.

Referring again to FIG. 4, if the answer to the question of the step 407 is affirmative (Yes), i.e. if there is a possibility that misfire has occurred and therefore the flag $F_{-MFPSBL}$ was set to 1 at the step 506 in FIG. 5, the program proceeds to a step 411, where it is determined whether or not the flag $F_{-MFTDCDIVm}$, which indicates a possibility that misfire has occurred, corresponding to the present value m, is equal to 1 (In the first loop immediately after the program proceeds from the step 410 to the step 411, the integer m assumes the predetermined value mLMT to which it was initialized at the step 509 in FIG. 5). If the answer to this question is negative (No), the program proceeds to a step 417, where the integer m is decreased by a decremental value of 1, and it is determined at a step 418 whether or not the resulting integer m is equal to 0. If the answer to this question is negative (No), the program returns to the step 411, and thereafter determination as to the flag $F_{-MFTDCDIVm}$ corresponding to each decreased value of the integer m is repeatedly carried out.

Figure 6:
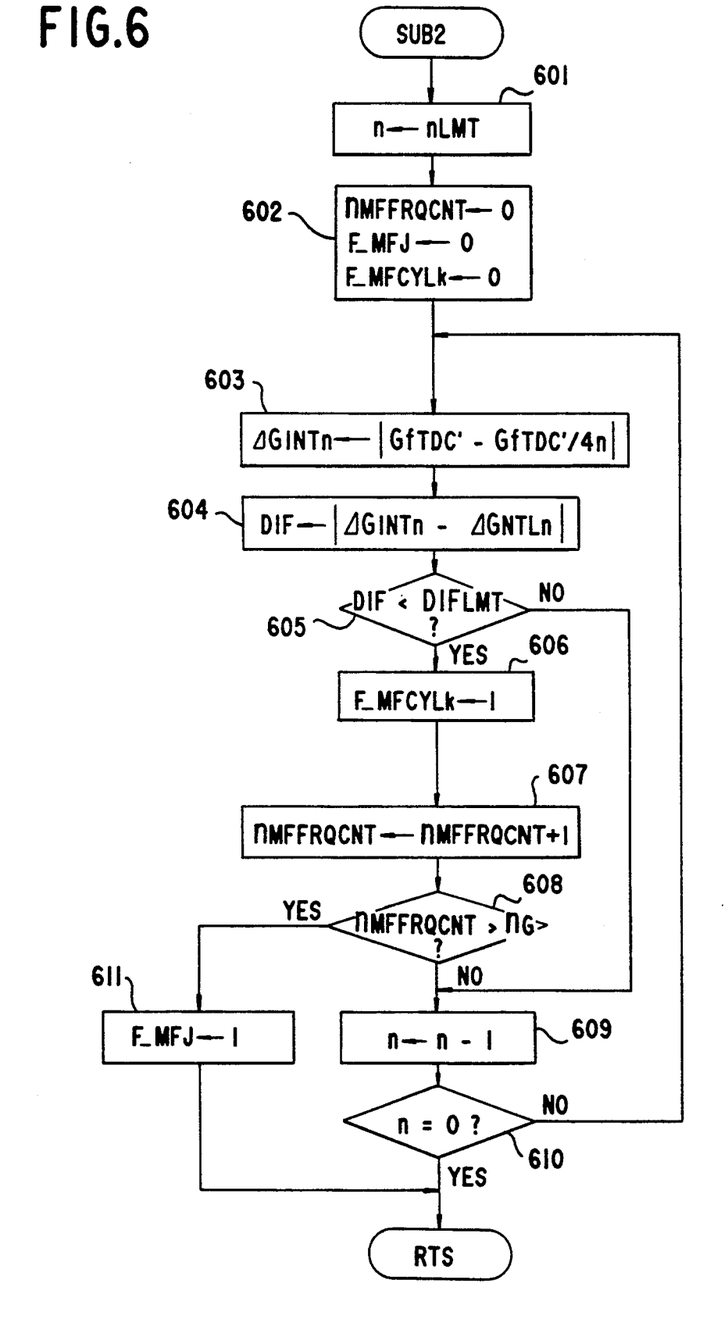
FIG. 6 is a flowchart of a subroutine SUB 2 executed at a step 416 appearing in FIG. 4.

If the answer to the question of the step 411 is affirmative (Yes), i.e. if the flag $F_{-MFTDCDIVm}$ corresponding to the present value m is equal to 1, the program proceeds to a step 412, where a cylinder #k (k=1, 2, 3, 4) is subjected to forced misfire every 4 mth TDC signal pulse. More specifically, the cylinder #k is forcedly subjected to misfire as explained hereinbefore with reference to FIGS. 3a to 3c at the period of occurrence of misfire indicated by the present value m. The engine rotational speed Ne under the forced-misfire condition is measured at a step 413 in a manner similar to the step 408, and then forced misfire is stopped at a step 414. At the following step 415, the engine rotational speed Ne measured at the step 413 is subjected to frequency analysis in a manner similar to the step 409. Then, at a step 416, based on the results of frequency analysis, a gain at each predetermined frequency is compared with a gain at $f_{TDC}$. Details of this comparison is will be explained below with reference to FIG. 6 showing a subroutine SUB 2.

First, at a step 601, an integer n corresponding to the integer m is set to a predetermined value nLMT (e.g. 30). At a step 602, a counter value $\eta_{MFFRQCNT}$, which indicates the number of frequencies at which gains obtained by the frequency analysis carried out under the forced-misfire condition are similar to respective corresponding gains obtained by the frequency analysis carried out under the spontaneous misfire condition, i.e. carried out at the step 409, is set to 0, a flag $F_{MFJ}$ which determinately indicates when assuming a value of 1 that misfire has occurred is set to 0, and a flag $F_{MFCYLk}$ (k=1, 2, 3, 4) which indicates when assuming a value of 1 that misfire has occurred in a cylinder #k is set to 0.

At the following step 603, there is calculated an absolute value $\Delta G_{INTn}$ of the difference between a gain $G_{fTDC}$ at a frequency $f_{TCD}$ and a gain $G_{fTDC/4n}$ at a frequency $f_{TCD/4n}$ (=$f_{TDC}/4n$), both the gains being obtained by the frequency analysis of the engine rotational speed assumed at the time of forced-misfire carried out at the step 412. n is an integer which is set to 1-30. Further, at a step 604, there is calculated an absolute value DIF of the difference between the absolute value $\Delta G_{INTn}$ of the difference between the gains calculated at the step 603 and an absolute value $\Delta G_{NTLn}$ which is identical to the absolute value $\Delta G_{NTLm}$ of the differene between the gains calculated at the step 503 in FIG. 5. If the absolute value DIF is small, it can be judged that the difference between the gains under the forced-misfire condition is equal to or similar to the difference between the gains at the time of occurrence of misfire. That is, it can be judged that the cylinder subjected to forced misfire actually undergoes misfire. Therefore, at the following step 605, it is determined whether or not the absolute value DIF is smaller than a predetermined value $DIF_{LMT}$ (e.g. 5 dB).

If the answer to the question of the step 605 is negative (No), the integer n is decreased by a decremental value of 1 at a step 609, and it is determined at a step 610 whether or not the resulting value of the integer n is equal to 0. If the answer to this question is negative (No), the program returns to the steps 603 et seq. to repeat the above-described comparison of gains, whereas if n is equal to 0, the present subroutine is immediately terminated, followed by the program proceeding to a step 417 in FIG. 4.

On the other hand, if the answer to the question of the step 605 is affirmative (Yes), it is judged that there is a possibility that misfire has occurred in the cylinder #k, so that the flag $F_{MFCYLk}$ is set to 1 at a step 606.

Even if the answer to the question of the step 605 becomes affirmative (Yes) at a certain frequency, i.e., when the integer n assumes a certain value, it is not sufficient to finally determine that the waveform of gains obtained under the forced-misfire condition is similar to or identical to the waveform of gains obtained under the spontaneous misfire condition. Therefore, at a step 607, the number of times the answer to the question of the step 605 is affirmative is counted. Specifically, the count value $\eta_{MFFRQCNT}$ is increased by an incremental value of 1. Then at the following step 608, it is determined whether or not the resulting count value $\eta_{MFFRQCNT}$ has exceeded a predetermined value (e.g. 5). If the answer to this question is negative (No), the program proceeds to the step 609, whereas if the answer is affirmative (Yes), it is judged that misfire positively occurs in the cylinder #k, so that the flag F_MFJ is set to 1, followed by terminating the present subroutine.

Referring again to the step 418 in FIG. 4, if the answer to the question of this step is affirmative, the program proceeds to a step 419, where the value k corresponding to each cylinder is increased by an incremental value of 1, and at the same time the integer m is set to the predetermined value mLMT. At a step 420, it is determined whether or not the resulting value of k is larger than a predetermined value (e.g. 4) which corresponds to the number of cylinders, and if the answer to this question is negative, i.e. the resulting value of k is not larger than the predetermined value, the program returns to the step 411 to repeatedly carry out the steps 411 to 419. In this manner, all the clylinders are sequentially subjected to forced misfire and comparison of gains is carried out.

Figure 7:
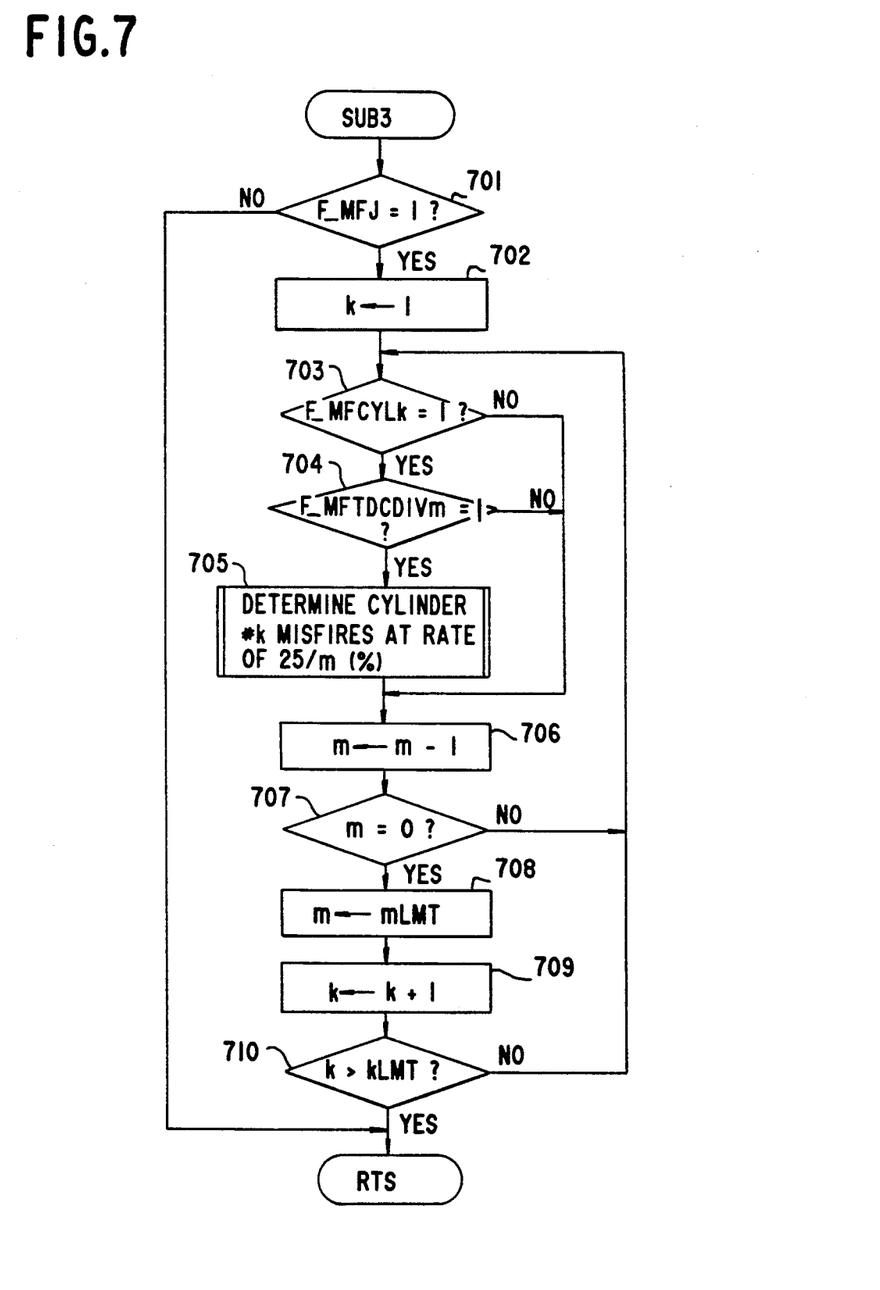
FIG. 7 is a flowchart of a subroutine SUB 3 executed at a step 421 appearing in FIG. 4.

If the answer to the question of the step 420 is affirmative (Yes), the program proceeds to a step 421, where a cylinder in which misfire occurs is specified and the rate of occurrence of misfire (frequency of occurrence of misfire) is calculated. Details of the step 421 will be described below with reference to FIG. 7 showing a subroutine SUB 3.

First, at a step 701, it is determined whether or not the flag $F_{MFJ}$ for determinative indication of positive occurrence of misfire is equal to 1. If this flag was not set to 1 at the step 611 in FIG. 6, the answer to the question of the step 701 is negative (No), so that the present subroutine is immediately terminated, and the program proceeds to a step 422 in FIG. 4, where k is set to 1, followed by terminating the present program.

On the other hand, if the answer to the question of the step 701 is affirmative (Yes), k is set to 1 at a step 702, and it is determined at a step 703 whether or not the flag $F_{MFCYLk}$ for indication of occurrence of misfire in the cylinder #k corresponding to the value of k is equal to 1, and at a step 704 whether or not the flag $F_{MFTDCDIVm}$ for indication of occurrence of misfire at a period represented by m is equal to 1. The integer m is set to the predetermined value mLMT at the preceding step 419 in FIG. 4.

If both the answers to the questions of the steps 703 and 704 are affirmative (Yes), the program proceeds to a step 705, where it is determined based on the values of k, m of the flags that misfire occurs in the cylinder #k at a rate of 25/m (%). More specifically, if misfire continually (m=1) occurs in the cylinder #1 (k=1) of a four-cylinder type engine, for example, the rate of occurrence of misfire is 25%.

At the following step 706, m is decreased by a decremental value of 1, and if the resulting value of m is not equal to 0 (i.e. the answer to the question of a step 707 is negative (No)), the program returns to the step 703 to repeatedly carry out the steps 703 to 706. If the resulting value of m is equal to 0 (i.e. if the answer to the question of the step 707 is affirmative (Yes), the integer m is set to the predetermined value mLMT at a step 708, and k is increased by an incremental value of 1 at a step 709. If it is determined at a step 710 that k is not larger than the predetermined value kLMT, the program proceeds to the step 703 to repeatedly carry out the steps 703 to 709, whereas if it is determined at the step 710 that k is larger than the predetermined value kLMT, the present subroutine is terminated.

In the above described embodiment, execution of the steps 411 to 422 is not essential, but positive detection of misfire may be effected by execution of only the steps 401 to 410.

Further, although, in the above described embodiment, the misfire-detecting system according to the invention is provided in a four-cylinder type engine, this is not limitative, but it goes without saying that the present system may be applied to an engine having any number of cylinders.

What is claimed is:

1. A system for detecting abnormality in combustion of an internal combustion engine based on fluctuations in the rotational speed of said engine, comprising:

signal-outputting means for outputting a signal corresponding to the rotational speed of said engine;

frequency-analyzing means for subjecting said signal from said signal-outputting means to frequency analysis to thereby detect amplitudes of components of said signal at respective predetermined frequencies;

comparing means for calculating a difference between an amplitude of a component of said signal at each of said respective predetermined frequencies and an amplitude of a component of said signal at one of said respective predetermined frequencies as a reference frequency, said amplitude of said component of said signal at said each of said respective predetermined frequencies and said amplitude of said component of said signal at said one of said respective predetermined frequencies as said reference frequency being detected by said frequency-analyzing means on the same occasion of operation of said engine; and abnormality-determining means for determining that there is abnormality in combustion of said engine when said difference is smaller than a predetermined value.

2. A system according to claim 1, wherein said comparing means calculates an absolute value of a difference between said amplitude of each of said components of said signal at said respective predetermined frequencies, and said amplitude of said component of said signal at said predetermined reference frequency, and said abnormality-determining means determines that there is abnormality in combustion of said engine when said absolute value of said difference is smaller than a predetermined value.

3. A system according to claim 1, wherein said engine comprises a plurality of cylinders, said system further comprising:

abnormality-forcing means for forcing combustion in a selected one of said cylinders to be abnormal; and abnormal cylinder-determining means for determining whether or not said selected one of said cylinders is a cylinder in which abnormality in combustion occurs based on amplitude of said components of said signal at said respective predetermined frequencies, said components being obtained by said frequency-analyzing means as a result of operation of said abnormality-forcing means.

4. A system according to claim 3, wherein said abnormal cylinder-determining means comprises:

means for calculating a first absolute value of a difference between said amplitude of each of said components of said signal at said respective predetermined frequencies and amplitude of a component of said signal at said predetermined reference frequency, said components of said signal at said respective predetermined frequencies and said predetermined reference frequency being obtained when said forcing of said combustion of said selected one of said cylinders to be abnormal was not carried out;

means for calculating a second absolute value of said difference between said amplitude of each of said components of said signal at said respective predetermined frequencies and said amplitude of said component of said signal at said predetermined reference frequency, said components of said signal at said respective predetermined frequencies and said predetermined reference frequency being obtained when said forcing of said combustion of said selected one of said cylinders to be abnormal was carried out;

means for calculating an absolute value of a difference between said first absolute value and said second absolute value; and first determining means for determining that there is a possibility of spontaneous occurrence of abnormality in combustion in said selected one of said cylinders when said last-mentioned absolute value is smaller than a predetermined value.

5. A system according to claim 4, wherein each of said respective predetermined frequencies is determined by a number indicative of a period of occurrence of abnormality in combustion in a cylinder.

6. A system according to claim 5, wherein said abnormality-forcing means forces said combustion in said selected one of said cylinders to be abnormal at a period of occurrence of abnormality in combustion at which said first absolute value is smaller than a second predetermined value.

7. A system according to any of the preceding claims, wherein said abnormal cylinder-determining means further comprises second determining means for counting a number of times said first determining means determines that there is a possibility of spontaneous occurrence of abnormality in combustion in said selected one of said cylinders, and finally determining that abnormality in combustion spontaneously occurs in said selected one of said cylinders, when said number of times is larger than a predetermined value.

8. A system according to claim 7, wherein said abnormal cylinder-determining means includes frequency-calculating means for calculating a frequency at which abnormality in combustion occurs in said selected one of said cylinders.

9. A system according to claim 8, wherein said frequency-calculating means calculates said frequency at which abnormality in combustion occurs in said selected one of said cylinders, by obtaining a reciprocal of a product of a number indicative of said period of occurrence of abnormality in combustion at which first absolute value is smaller than said second predetermined value and a total number of said cylinders.

10. A system according to claim 1, wherein said engine has a plurality of cylinders, said predetermined reference frequency being determined based on the rotational speed of said engine and the number of said cylinders.

11. A system according to claim 10, wherein said respective predetermined frequencies are each less than a quarter of said predetermined reference frequency.

12. A system for detecting abnormality in combustion of an internal combustion engine based on fluctuations in the rotational speed of said engine, said engine including a plurality of cylinders, said system comprising:

signal-outputting means for outputting a signal corresponding to the rotational speed of said engine;

frequency-analyzing means for subjecting said signal from said signal-outputting means to frequency analysis;

comparing means for calculating a difference between amplitudes of each of components of said signal at respective predetermined frequencies and an amplitude of a component of said signal at a predetermined reference frequency, said components of said signal at said respective predetermined frequencies and said component at said predetermined reference frequency being obtained by said frequency analysis;

abnormality-determining means for determining that there is abnormality in combustion of said engine when said difference is smaller than a predetermined value;

abnormality-forcing means for forcing combustion in a selected one of said cylinders to be abnormal; and abnormal cylinder-detecting means for determining whether or not said selected one of said cylinders is a cylinder in which abnormality in combustion occurs based on amplitude of said components of said signal at said respective predetermined frequencies, said components being obtained by said frequency analyzing means as a result of operation of said abnormality-forcing means.

13. A system for detecting abnormality in combustion of an internal combustion engine based on fluctuations in the rotational speed of said engine, said engine including a plurality of cylinders, said system comprising:

signal-outputting means for outputting a signal corresponding to the rotational speed of said engine;

frequency-analyzing means for subjecting said signal from said signal-outputting means to frequency analysis;

comparing means for calculating a difference between amplitudes of each of components of said signal at respective predetermined frequencies and an amplitude of a component of said signal at a predetermined reference frequency, said predetermined reference frequency being determined based on the rotational speed of said engine and the number of said cylinders, said components of said signal at said respective predetermined frequencies and said component at said predetermined reference frequency being obtained by said frequency analysis; and abnormality-determining means for determining that there is abnormality in combustion of said engine when said difference is smaller than a predetermined value.

14. A system according to claim 12, wherein said respective predetermined reference frequencies are each less than a quarter of said predetermined reference frequency.

* * * * *